US006816602B2

United States Patent
Coffelt et al.

(10) Patent No.: US 6,816,602 B2
(45) Date of Patent: Nov. 9, 2004

(54) SYSTEM AND METHOD OF DEFERRED POSTAL ADDRESS PROCESSING

(75) Inventors: David J. Coffelt, Owego, NY (US); Robert M. Krohn, Vestal, NY (US); Jeffrey Scott Poulin, Endicott, NY (US); Alfred T. Rundle, Endwell, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 398 days.

(21) Appl. No.: 09/797,110

(22) Filed: Mar. 1, 2001

(65) Prior Publication Data

US 2002/0122569 A1 Sep. 5, 2002

(51) Int. Cl.$^7$ ................................................ G06K 9/00
(52) U.S. Cl. .................................... 382/101; 209/584
(58) Field of Search ............................. 382/101, 321; 209/584, 900, 583; 700/224, 227

(56) References Cited

U.S. PATENT DOCUMENTS

| | | | |
|---|---|---|---|
| 5,031,223 A | 7/1991 | Rosenbaum | 382/1 |
| 5,287,271 A | 2/1994 | Rosenbaum | 364/409 |
| 5,311,597 A | 5/1994 | Rosenbaum | 382/1 |
| 5,566,299 A | 10/1996 | Billings | 395/182.02 |
| 5,667,078 A | 9/1997 | Walach | 209/584 |
| 6,292,709 B1 * | 9/2001 | Uhl et al. | 700/226 |

* cited by examiner

Primary Examiner—Leo Boudreau
Assistant Examiner—Ryan J. Miller
(74) Attorney, Agent, or Firm—Louis J. Franco; Leland D. Schultz; Patrick M. Hogan

(57) ABSTRACT

The invention is characterized in certain aspects by data processing architectures and methods of processing a mail piece having a destination address field through outgoing and incoming mail centers. An illustrative method includes receiving a mail piece at an outgoing mail center for transport to an incoming mail center and subsequent sorting and transport from the incoming mail center to an an addressee. The mail piece includes a destination address field that is divided into a first address portion and a second address portion. The first address portion is interpreted at the outgoing mail center and used to sort the mail piece for transport to the incoming mail center. The second address portion is eventually resolved and used by the incoming mail center to sort the mail piece for subsequent delivery to an addressee. Because resolution of the second address portion is not required until the physical mail piece arrives at the incoming mail center, secondary address resolution is delayed in accordance with a set of predetermined time parameters. The second address portion is eventually resolved to generate a set of sorting instructions that are made accessible to the incoming mail center in accordance with the specified time parameters. By assigning a deferral time unique to each mail piece of a selected plurality of mail pieces, secondary address resolution for those mail pieces can be prioritized according to need.

11 Claims, 9 Drawing Sheets

Mail Piece

OUTGOING MAIL CENTER 100

| Outgoing Mail Center | Incoming Mail Center | Departure Time | Deferral Time (hrs) (Min. to Max. Time Window) |
|---|---|---|---|
| Worcester, MA | 137xx-139xx Binghamton, NY | 10:00am | $7.00 < T_D < 9.00$ |
| Worcester, MA | " | 7:00pm | $5.00 < T_D < 7.00$ |
| Worcester, MA | 140xx-143 Buffalo, NY | 10:10am | $18.25 < T_D < 19.25$ |
| Worcester, MA | " | 4:30pm | $16.50 < T_D < 17.50$ |
| Worcester, MA | " | 7:25pm | $15.75 < T_D < 17.00$ |
| Worcester, MA | 144-146 Rochester, NY | 10:10am | $16.25 < T_D < 17.50$ |
| Worcester, MA | " | 4:30pm | $14.50 < T_D < 16.25$ |
| Worcester, MA | " | 7:25pm | $13.75 < T_D < 15.50$ |
| . . . . . . . . . . | . . . . . . . . | . . . . . | . . . . |
| Worcester, MA | . . . . . . . . | . . . . . | . . . . |
| Worcester, MA | . . . . . . . . | . . . . . | . . . . |
| Worcester, MA | . . . . . . . . | . . . . . | . . . . |
| Worcester, MA | 786-787,789 Austin,TX | 8:30pm | $43.00 < T_D < 46.25$ |
| Worcester, MA | . . . . . . . . | . . . . . | . . . . |
| Worcester, MA | 797 Midland, TX | 8:30pm | $47.75 < T_D < 49.50$ |
| Worcester, MA | | | |
| Worcester, MA | | | |
| Worcester, MA | | | |
| Worcester, MA | | | |
| Worcester, MA | | | |
| Worcester, MA | | | |
| Worcester, MA | | | |
| Worcester, MA | | | |
| Worcester, MA | | | |
| Worcester, MA | | | |
| Worcester, MA | | | |
| Worcester, MA | | | |
| Worcester, MA | | | |
| Worcester, MA | | | |
| | | | |
| | | | |
| | | | |

Scheduler 180 including Look-up Table

FIG. 5

| A method for deferred processing of a mail piece through an outgoing mail center and an incoming mail center for ultimate delivery to an addressee, the mail piece having a destination address field with a first address portion including sufficient information to route the mail piece to the incoming mail center and a second address portion including sufficient information to deliver the mail piece to an addressee from the incoming mail center, including the steps of |
|---|

↓

| receiving the mail piece at the outgoing mail center | 460 |
|---|---|

↓

| capturing an image of the destination address field at an outgoing mail center and storing the image in computer memory, the captured image including a first address portion image corresponding to the first address portion of the destination address field on the mail piece and a second address portion image corresponding to the second address portion of the destination address field on the mail piece | 465 |
|---|---|

↓

| marking the mail piece with a unique identification mark representing its identity and storing a computer memory record of the identification mark in association with the stored image of the destination address field | 470 |
|---|---|

↓

| resolving the first address portion image to generate a first signal representing the incoming mail center | 475 |
|---|---|

↓

| sorting the mail piece at the outgoing mail center in response to the first signal for transport to the incoming mail center | 480 |
|---|---|

↓

| maintaining data relating the outgoing mail center and the incoming mail center, the data including at least a predetermined transit time indicative of the time required for the mail piece to be transported from the outgoing mail center to the incoming mail center | 485 |
|---|---|

↓

| consulting the maintained data and assigning a deferral time based on the transport time data, the deferral time representing at least an acceptable maximum length of time that can elapse from a first established point in time in the processing of the mail piece before the second address portion image is resolved and the results of resolution rendered accessible to the incoming mail center | 490 |
|---|---|

↓

| transporting the mail piece from the outgoing mail center to the incoming mail center | 495 |
|---|---|

↓

| resolving the second address portion image to generate a second signal representing the information necessary to further route the mail piece for delivery to an addressee from the incoming mail center | 500 |
|---|---|

↓

| rendering the second signal accessible to the incoming mail center before the expiration of the maximum acceptable elapsed time | 505 |
|---|---|

↓

| receiving the mail piece at the incoming mail center | 510 |
|---|---|

↓

| identifying the mail piece at the incoming mail center by reading the unique identification mark thereon and associating the mail piece with the second signal | 515 |
|---|---|

↓

| sorting the mail piece in response to the second signal for delivery to the addressee | 520 |
|---|---|

FIG. 9

SYSTEM AND METHOD OF DEFERRED POSTAL ADDRESS PROCESSING

BACKGROUND

Individuals, institutions, and post office employees introduce items of mail into the postal system at local post office branches. Once the receiving post office branch is in possession of a mail piece, the mail piece begins a journey through a highly organized system. Mail received into the postal system at a local branch office is eventually transported to a centralized postal hub. There are in excess of 250 postal hubs in the United States. These "hubs" are known by alternative names including (i) processing and distribution centers, (ii) general mail facilities and (iii) mail distribution centers. Postal hubs are regional mail centers that service individual post office branches within a particular range of ZIP Codes. Typically, a postal hub services one or more "three-digit ZIP Code areas." For example, the Central Massachusetts Processing and Distribution Center (also known as the "Worcester Facility") services the local post office branches situated in all the ZIP Codes beginning with "014", "015," "016," and "017." That is, mail destined for or departing from a local branch office within a ZIP Code beginning with any one of the four sets of three digits in the previous sentence will, under normal circumstances, pass through the Worcester facility. The Worcester facility services more than two dozen towns, each with its own local branch office. Nationally, the 250 plus hubs collectively service approximately five thousand individual postal branch offices.

Mail coming into and going out of the various local branch offices in a particular geographic region is processed through one or more hubs before delivery to its final destination. For instance, a mail piece originating in Southbridge, Mass. (01550) and destined for Littleton, Mass. (01460) is processed through the Worcester facility only (i.e., a single hub), because the ZIP Code of origin and the destination ZIP Code are both serviced by the Worcester hub. However, in many instances, a mail piece is processed through two hubs between the time of its introduction into the system and its ultimate delivery to an addressee. This is the case, for instance, when a mail piece is received at a branch office that is not serviced by the same hub that services the branch office responsible for delivery of the mail piece to the intended recipient. In such a case, a mail piece received at a branch office is transported to an "outgoing hub" where the mail piece is sorted and routed for transportation to an "incoming hub." The incoming hub is the hub that services the local branch office responsible for delivery of the mail piece to the intended recipient. For example, a mail piece originating at Littleton, Mass. (01460) and destined for Owego, N.Y. (13827) is transported from Littleton, Mass. to the Worcester, Mass. facility (i.e., the outgoing hub). At the Worcester facility, the mail piece is sorted and deposited on an appropriate vehicle for transport to the postal hub at Binghamton, N.Y. (i.e., the incoming hub) because the Binghamton hub services the local post office branches beginning with "137," "138," and "139." Once delivered to the Binghamton hub, the mail piece is sorted and delivered to the local, Owego, N.Y. branch office (13827) from which it is transported to the mailbox of the addressee, for example.

Mechanical, electronic and computer apparatus enable postal clerks to process large volumes of mail each day. Larger postal facilities (e.g., hubs) are equipped with rigid containers, bins on wheels, conveyor belts, forklifts, cranes, and other machinery to facilitate the handling of large quantities of mail. There are also segregating machines to separate a mixture of mail into different types.

Some first-class mail is precancelled. If not precancelled, mail pieces must go through a facer-canceler machine. Such a machine can process tens of thousands of letters an hour. Facing is the process of aligning letters so that the address side is facing the canceler, with the stamps in the same corner. The machine prints wavy black lines over the stamp, for example, canceling it so that it cannot be used again. Alongside the stamp is printed a circle containing the date, place, and time of stamping. The circle and wavy lines constitute the letter's postmark. Typically, mail pieces are canceled at a hub.

After postmarking is completed, mail pieces are ready to be sorted according to destination. Traditionally, clerks sorted mail pieces by hand according to destination, using racks of pigeonholes, called distribution cases. Increasingly, however, the sorting process has been automated.

The United States introduced ZIP (Zone Improvement Plan) Codes in 1963. Users of the mail service place a five-digit number (ZIP Code) at the end of the address. The first three digits identify the section of the country to which the mail piece is being sent, while the last two identify the specific post office or zone at the destination. ZIP Codes enable the use of optical and electronic reading and sorting equipment.

In the 1980's the United States Postal Service introduced a voluntary nine-digit ZIP Code system. Four additional digits were added to the original ZIP Code after a hyphen to speed automated sorting operations. Of the four additional numbers, the first two indicate a specific sector of a city or town such as a cluster of streets or large buildings. The second two numbers represent an even smaller segment such as one side of a city block, one floor of a large building, or a group of post office boxes.

Increasingly, tasks once performed manually are now performed mechanically, electronically and by computers. For instance, destination addresses once read by human beings who sorted mail pieces into compartments based on destination city, for example, are now read by machine (e.g., scanned by optical character recognition apparatus). An image of a destination address is captured and stored in computer memory. Character recognition algorithms analyze the captured image and resolve it into a string of alphanumeric data to generate signals that instruct sorting machines where to route individual mail pieces. Such systems have dramatically increased the efficiency of the postal system and the overall volume of mail that the system can handle.

Despite the technological advances of recent decades, postal management is still largely concerned with the efficient administration and deployment of large bodies of manpower, the organization of large transport fleets, many aspects of property management, and financial and economic problems. Automation and computer technology have increasingly been exploited as a management aid with the realization that the postal service operates within a commercial market where competition from private companies can be fierce and efficiency is the watchword.

With a steady emphasis on efficiency, processes have been devised to reallocate resources in order to facilitate the processing of as many mail pieces as possible during any particular window of time. In some instances, deferring certain aspects of processing, in particular, address interpretation (i.e., resolution), until required further in the overall processing of a mail piece has proven useful. Deferring the processing of information that is not required until later in the routing and processing of a mail piece frees up human and computer resources to handle tasks that must be completed sooner rather than later.

One problem associated with current postal address interpretation methods and architectures is that they rely on first-come, first-served processing of images. Absent a method of prioritizing workflow, physical mail processing cannot proceed until all images complete address interpretation. This results in large, costly "spikes" in required automatic and manual address interpretation resources.

Consequently, there exists a need for a method of prioritizing address resolution in accordance with when the resolved address data is required rather than on a first-come, first-served basis.

SUMMARY

In one aspect, the present invention concerns a method and architecture for improving the efficiency with which postal personnel and equipment are utilized. Although the invention is particularly well-suited for use within the postal system, it will be appreciated that its scope and application of uses are not so limited. Accordingly, terms such as mail piece, mail center etc. should not be interpreted so narrowly as to limited them to their literal meanings. In general terms, any item that undergoes transport from an origin to a destination through an organized delivery system can be considered a mail piece for purposes of this specification and the appended claims. Additionally, the place at which the item is received into the system, the final depot responsible for its delivery to an addressee, and each intermediate-handling center responsible for some aspect of its routing, sorting, tracking and transport can be considered a mail center. Furthermore, although the invention is adaptable for use in virtually all contexts in which large numbers of items are transported to numerous locations, the discussion and examples illustrating its implementation are presented primarily in the context of the sorting and movement of mail within and between postal hubs of the U.S. Postal Service.

Various embodiments and versions of the invention may include one or more of the following features.

One method for deferred processing of a mail piece including a delivery address through first and second mail centers includes the following steps.

A mail piece having a first address portion including sufficient information to route the mail piece to an incoming mail center, and a second address portion including sufficient information to further route the mail piece for delivery to an addressee from the incoming mail center, is received by an outgoing mail center. In a typical version, the outgoing and incoming mail centers are postal hubs uniquely identifiable upon resolution of only the first three or four digits of a five-digit ZIP Code, as previously discussed. In such a version, postal employees transport mail pieces from local post office branches to the outgoing mail center.

The first address portion is resolved (i.e., interpreted) to determine the incoming mail center for which the mail piece is bound. The resolution of the first address portion may be done manually by a postal employee, but more commonly will be performed with the aid of a computer including OCR (optical character recognition) scanning equipment and an interpretation program. For tracking and information-associating purposes, a unique identification mark such as a bar code, for example, is associated with the mail piece. The identification mark is physically applied to the mail piece using ink or a sticker including the identification mark, for instance. Furthermore, a record is maintained, independent of the marking on the mail piece, associating the unique identification mark and the first and second address portions. This record is typically maintained in the memory of a computer.

The mail piece is physically sorted at the outgoing mail center based on the resolved first address portion to an appropriate transport vehicle bound for the incoming mail center. Present day sorting and routing within postal hubs is performed almost entirely by machines, including conveyors, that receive appropriate instructions from stored computer data as to how to route a particular mail piece. Although the first three or four digits of a five-digit destination ZIP Code is typically sufficient to sort a mail piece to the appropriate transport vehicle at the outgoing mail center for transport to an incoming mail center, alternatively, the city and state might be relied upon. The city and state may also be relied upon when, for instance, a ZIP Code has been omitted or when the ZIP Code is incorrect or unrecognizable.

In an implementation, data is maintained relating the outgoing mail center and the incoming mail center. More specifically, in one version, at least a predetermined transport time indicative of the time required for an item of mail of the same class as the mail piece to be transported between the outgoing and incoming mail centers is maintained (e.g., stored in a "look-up" table in computer memory). The time required for transit may depend on such factors as the time of year and even the time of departure of the mail piece on a particular day of the week. Accordingly, this data may be periodically or constantly updated, particularly if plural mail pieces are tracked and their transit times are calculated, recorded and averaged by a computer, for example. In alternative versions, transport-time data for every mail piece bound for an incoming mail center from an outgoing mail center can be tracked or such data can be tracked intermittently. For example, every third or fifth mail piece bound for a particular incoming mail center might be tracked for transport time. By automatically tracking such information and storing it in a data processing system, for instance, real time statistical data can be compiled, maintained and made accessible to either or both of the outgoing and incoming mail centers. Such data can be used at the outgoing mail center in order to constantly or periodically update the "deferral times" discussed immediately below. The incoming mail center could use the data, for example, to prepare resources for a particular volume of work during a particular window of time.

Based on maintained travel-time data, a deferral time is assigned and associated with a mail piece depending on the outgoing mail center from which a mail piece originates and the incoming mail center for which it is destined. A predetermined deferral time represents, for example, a maximum length of time that can elapse from some established point in time in the processing of the mail piece before the second address portion is resolved and rendered available to the incoming mail center for use in further sorting the mail piece to an addressee. Alternatively, the deferral time can represent a minimum elapsed time before resolution and availability of the second address portion is required. Another alternative is to provide a range (i.e., a time window) whose end points are minimum and maximum deferral times. As an example, a computer instruction may read "defer for no less than 48 hours and no greater than 71 hours" (e.g., 48 hrs < deferral time <71 hrs). deferral time in terms including at least a maximum time; by including a maximum elapsed time, the required information will not arrive later than it is needed at the incoming mail center. Contrarily, if the deferral time is expressed only in terms of a minimum elapsed time, processing will be delayed for at least that minimum amount of time, but could be delayed longer than desired, resulting in a backlog of unsortable mail at the incoming mail center. The established point in time from which the deferral time begins to run could be the departure time of the transport vehicle or the time the mail piece is marked with the unique identification mark and the record of the identification mark and first and second address portions recorded, for example.

Fluctuations in acceptable deferral times may exist for different times of the year, week or even the day. Another factor is the mode of transportation by which a mail piece is to be transported. By maintaining statistical data relating to transit times, deferral times can be adjusted continuously and/or periodically based on such data. For example, an acceptable maximum deferral time for a mail piece departing from an outgoing mail center in Boston on a Tuesday in August, and bound for Los Angeles, may be 70 hours, while an acceptable deferral time for the same mail piece departing on a Thursday in mid-December may be 90 hours. Maintaining and consulting real-time transit data facilitates the adjustment of deferral times to reflect current conditions in the handling of mail between two or more mail centers, thereby adding an additional dimension of efficiency.

A record of the unique identification mark is transmitted, and at least the resolved second address portion is made available to the incoming mail center in association with the unique identification mark within, for example, an elapsed time not exceeding the maximum time expressed in a deferral time. When implemented with the aid of a computer system, this information can be stored and associated in a mail piece computer memory folder and/or data block. In this way, the resolved second address portion can be "matched" (i.e., re-associated) with the physical mail piece at the incoming mail center and the mail piece routed for delivery to an addressee.

In alternative versions, the second address portion is resolved, for example, at the outgoing mail center, the incoming mail center or at some third location such as a central or regional computer network and/or employee center to which both the outgoing and incoming mail centers are communicatively linked. Regardless of the particular location of resolution, an important factor is that the second address portion be interpreted and rendered accessible to the incoming mail center when needed. The transmission and resolution of the information required by the incoming mail center can be performed while the mail piece is in transit between the outgoing and incoming mail centers.

The foregoing examples having focused on the deferred processing of individual mail pieces, plural mail pieces are processed through an outgoing mail center and various respective incoming mail centers, depending on respective destinations, according to one or more versions of a method for deferred processing generally as follows.

A plurality of mail pieces is received at an outgoing mail center. Each mail piece of the plurality has a destination address field with a first address portion including sufficient information to route the mail piece to its respective incoming mail center and a second address portion including sufficient information to further route the mail piece for delivery to an addressee from the respective incoming mail center, as generally described in previous examples.

An image is captured of the destination address field of each mail piece of the plurality of mail pieces at the outgoing mail center and the image corresponding to each mail piece is stored in computer memory. The captured image corresponding to each mail piece includes a first address portion image corresponding to the first address portion of the destination address field on the mail piece and a second address portion image corresponding to the second address portion of the destination address field on the mail piece.

Each mail piece is marked with a unique identification mark representing its identity and a computer memory record of the identification mark is stored in association with the stored image of the destination address field corresponding to that mail piece.

The first address portion image corresponding to each mail piece is resolved to generate a first signal representing the respective incoming mail center for that mail piece and each mail piece of the plurality of mail pieces at the outgoing mail center is sorted in response to the first signal corresponding to that mail piece for transport to the respective incoming mail center for that mail piece.

Data is maintained relating the outgoing mail center to each respective incoming mail center. The data reflects at least a predetermined transit time indicative of the time required for a mail piece to be transported from the outgoing mail center to each respective incoming mail center.

Each mail piece of the plurality of mail pieces is transported from the outgoing mail center to its respective incoming mail center.

The second address portion image corresponding to each mail piece of the plurality of mail pieces is resolved to generate a second signal representing the information necessary to further route the mail piece for delivery to an addressee from its respective incoming mail center and the second signal corresponding to each mail piece is rendered accessible to the respective incoming mail center for that mail piece.

The order in which second signals corresponding to mail pieces of the plurality of mail pieces are at least one of (i) generated and (ii) made accessible to the respective incoming mail centers is prioritized in accordance with when the second signals are required by each of the respective incoming mail centers, depending on the maintained data relating the outgoing mail center to the respective incoming mail centers.

Each mail piece is received at its respective incoming mail center and identified by reading the unique identification mark thereon, and the mail piece is associated with the second signal corresponding to that mail piece.

Each mail piece is then sorted at its respective incoming mail center in response to the second signal corresponding to that mail piece for delivery to the addressee.

An advantage of deferring selected portions of processing in general accordance with one or more of the foregoing methods is that resources, whether human or computer based, can be more efficiently utilized by selective allocation as required. For instance, it is not required that the second address portion of a mail piece be resolved and made available any sooner than that information is needed at the incoming mail center to further sort the mail piece for final delivery. Therefore, rather than dedicating resources at the outgoing mail center to full address resolution for each mail piece on a first-come, first-served basis, for example, resources can be more efficiently utilized by resolving only that information that is necessary to route each mail piece to the next stage in its processing.

Secondary address resolution for each mail piece is prioritized relative to other mail pieces according to when resolved secondary address information is needed. For instance, consider first and second mail pieces of the same class entering the postal system through an outgoing mail center in Boston and bound for New York City and Austin, Tex., respectively. The second address portion of the New York City-bound first mail piece will be resolved and made available to the incoming mail center in New York City before the second address portion of the second mail piece is resolved and made available to the incoming mail center in Austin. This example is consistent with the observation that the time required for the first mail piece to reach New York City will generally be less than the time required for the second mail piece to reach Austin. By deferring the processing of information that is not required until a later point in time and, furthermore, processing such further information for plural mail pieces according to the order in which it is required, increased efficiency in the utilization of resources is realized.

Contrarily, in a system that processes address information on a first-come, first-served basis, second portion address information for an Austin-bound mail piece that enters the postal system just prior to a NYC-bound mail piece would have its second portion address information resolved prior to that of the NYC-bound mail piece. Under such a system, something must give. For instance, either unnecessary delay in delivery of the NYC-bound mail piece results or the postal system is required to dedicate inordinate resources to ensure the smooth and timely flow of mail. In either event, efficiency is not maximized.

BRIEF DESCRIPTION OF THE DRAWINGS

FIG. 5 is of a look-up table relating an outgoing mail center to various incoming mail centers;

FIG. 9 illustrates the steps of another method for deferred processing of a mail piece.

DETAILED DESCRIPTION

The following description of a deferred postal address process and architecture, and various implementations thereof, is demonstrative in nature and is not intended to limit the invention or its application of uses.

Figure 1:
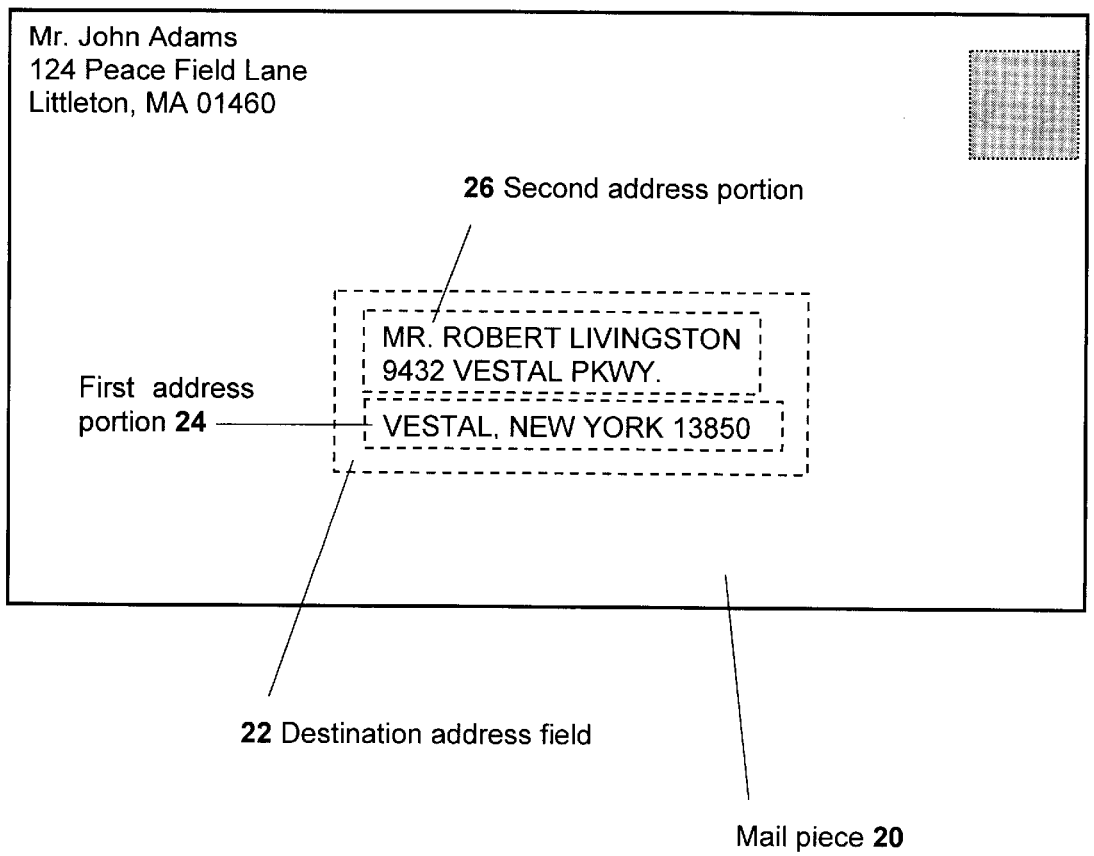
FIG. 1 shows a mail piece including a destination address.
Figure 2:
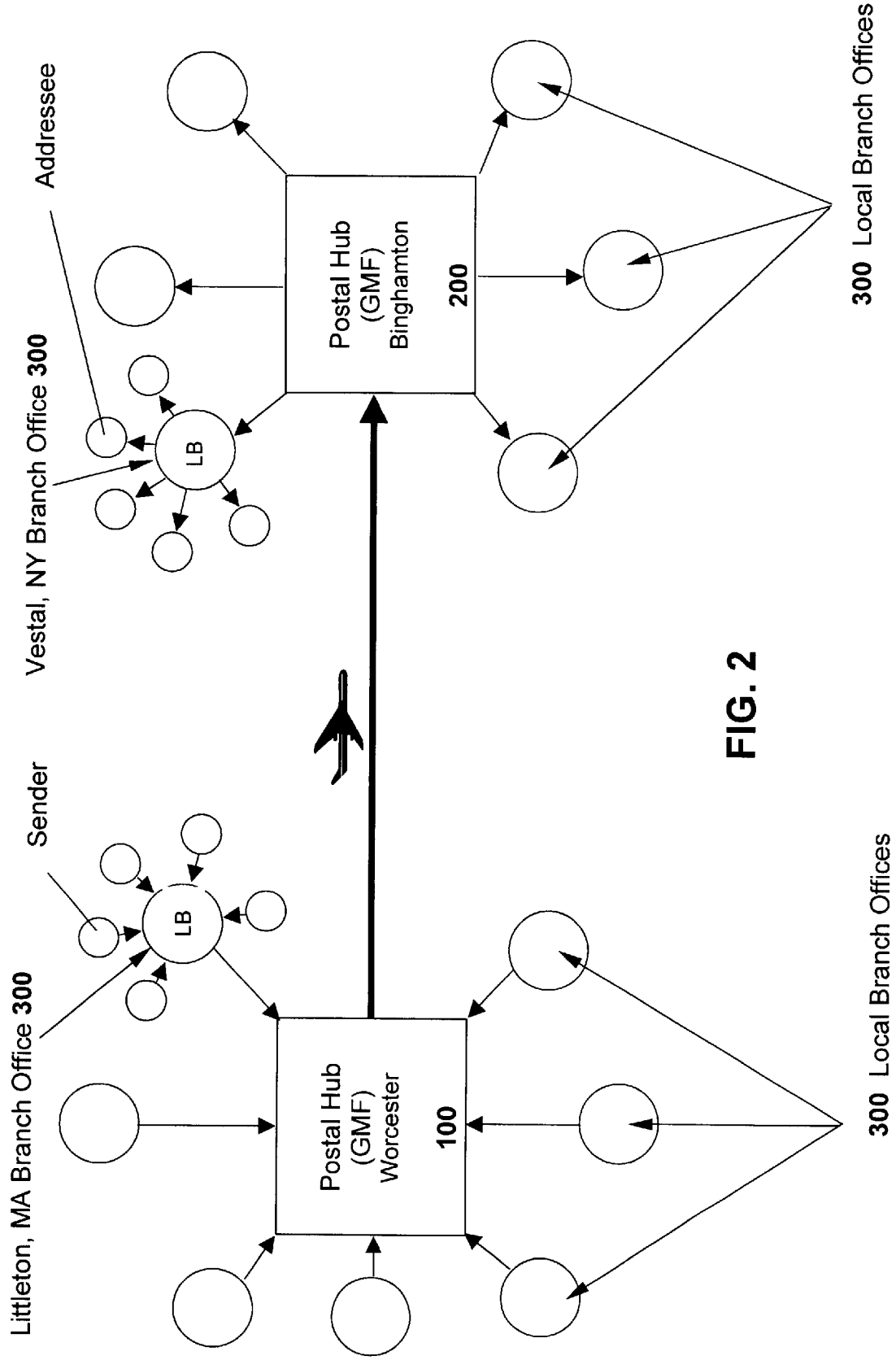
FIG. 2 illustrates the movement of the mail piece in FIG. 1 through the postal system.
Figure 3:
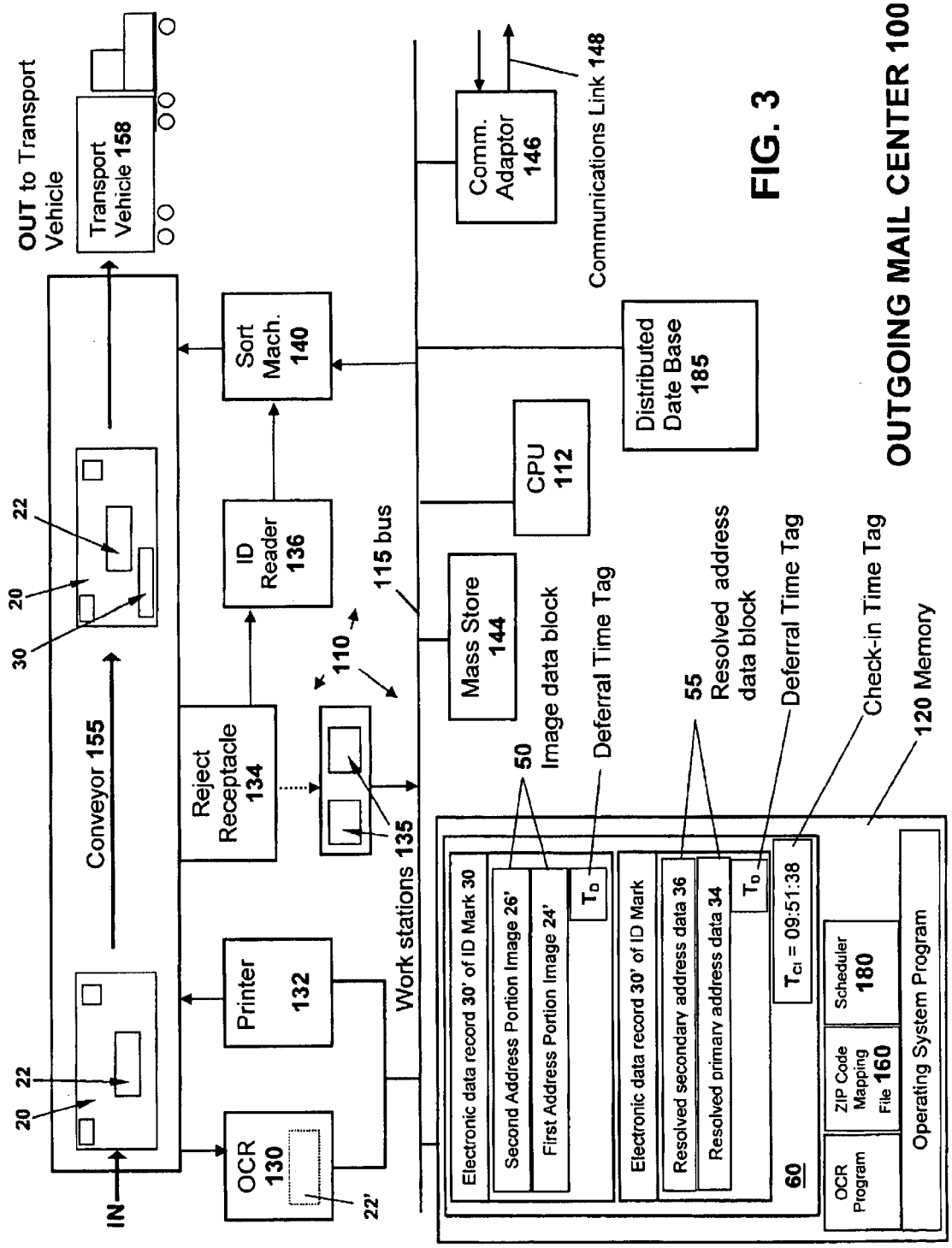
FIG. 3 is an architectural block diagram of an outgoing mail center.

Referring to FIGS. 1, 2, and 3, a mail piece 20 is entered into the postal system and received at an outgoing mail center 100. The mail piece 20 includes a delivery address field 22 having a first address portion 24 and a second address portion 26. The first address portion 24 includes at least enough information to route the mail piece 20 for transport to an incoming mail center 200 such as city, state and a five-digit ZIP Code, for example. The second address portion 26 includes more specific information that will be required by the incoming mail center 200 to further route the mail piece 20 to an addressee. For instance, the second address portion 26 may include street, building, apartment or house number, addressee information and/or "plus 4" and "plus 2" ZIP Code digits.

FIG. 2 illustrates the movement through the postal system of the mail piece 20 of FIG. 1 in going from Littleton, Mass. to Vestal, N.Y. A sender deposits the mail piece 20 at the local branch office 300 in the town of Littleton. From Littleton, the mail piece 20 is transported to the outgoing mail center 100 at Worcester, Mass. From the outgoing mail center 100 at Worcester, Mass., the mail piece 20 is transported to the incoming mail center 200 at Binghamton, N.Y. From the incoming mail center 200 at Binghamton, the mail piece 20 is transported to the local branch office 300 in the town of Vestal, N.Y. The local branch office 300 in Vestal then delivers the mail piece 20 to the addressee.

FIG. 3 is a function-block diagram of the architecture at an illustrative outgoing mail center 100. The outgoing mail center 100 includes a data processing system 110. The data processing system 110 includes a central processing unit (CPU) 112 which is connected by a bus 115 to a memory 120, an optical character recognition machine (OCR) 130, a printer 132, and an identification-mark reader 136. The system architecture further includes a sorting machine 140, a mass store 144 and a communications adapter 146, all communicatively linked by the system bus 115. The communications adapter 146 communicates via a communications link 148 with various incoming mail centers 200 to which the outgoing mail center 100 sends mail for further processing.

At the outgoing mail center 100 of FIG. 3, a mail piece 20 is deposited on a conveyor 155, where it is conveyed passed the OCR 130. The OCR 130 scans and captures an image 22' of the destination address field 22 from the physical mail piece 20 and stores the captured image 22' as a two-dimensional bit plane of pixels in the mass store 144. A unique identification mark 30 is associated with the captured image 22' and an computer memory record 30' of the unique identification mark 30 is stored in conjunction therewith in an image data block 50 corresponding to the physical mail piece 20. Typically, the identification mark 30 comprises a bar code, for example. A printer 132 prints the unique identification mark 30 on the physical mail piece 20. The unique identification mark 30 allows the corresponding captured destination address field image 22' to be accessed and, when necessary, re-associated with the corresponding physical mail piece 20.

The captured image 22' includes a first portion image 24' of the first address portion 24 and a second portion image 26' of the second address portion 26. OCR algorithms resolve (or interpret) the captured first portion image 24' into an alphanumeric character string of resolved primary address data 34. In one version, only enough of the first portion image 24' is resolved to ascertain the incoming mail center 200 and route the mail piece 20 to an appropriate transport vehicle 158 at the outgoing mail center 100. Once the OCR 130 has resolved enough of the captured first portion image 24' to ascertain the incoming mail center 200, attempts at further resolution cease. The resolved first address portion 24 information is stored as resolved primary address data 34 in a resolved address data block 55. Eventually, OCR algorithms attempt to resolve the second portion image 26' and store it as resolved secondary address data 36 in the resolved address data block 55. Resolution of the second address portion image 26' is deferred in accordance with parameters discussed further in this description. The unique identification mark 30 is also associated with the address data block 55 so that the information in the resolved address data block 55 can be associated (i.e., matched) with the physical mail piece 20. In one version, as shown in FIG. 3, the image data block 50 and the resolved address data block 55 are associated with a computer memory record 30' of the unique identification mark 30 in a mail piece computer memory folder 60.

Figure 4:
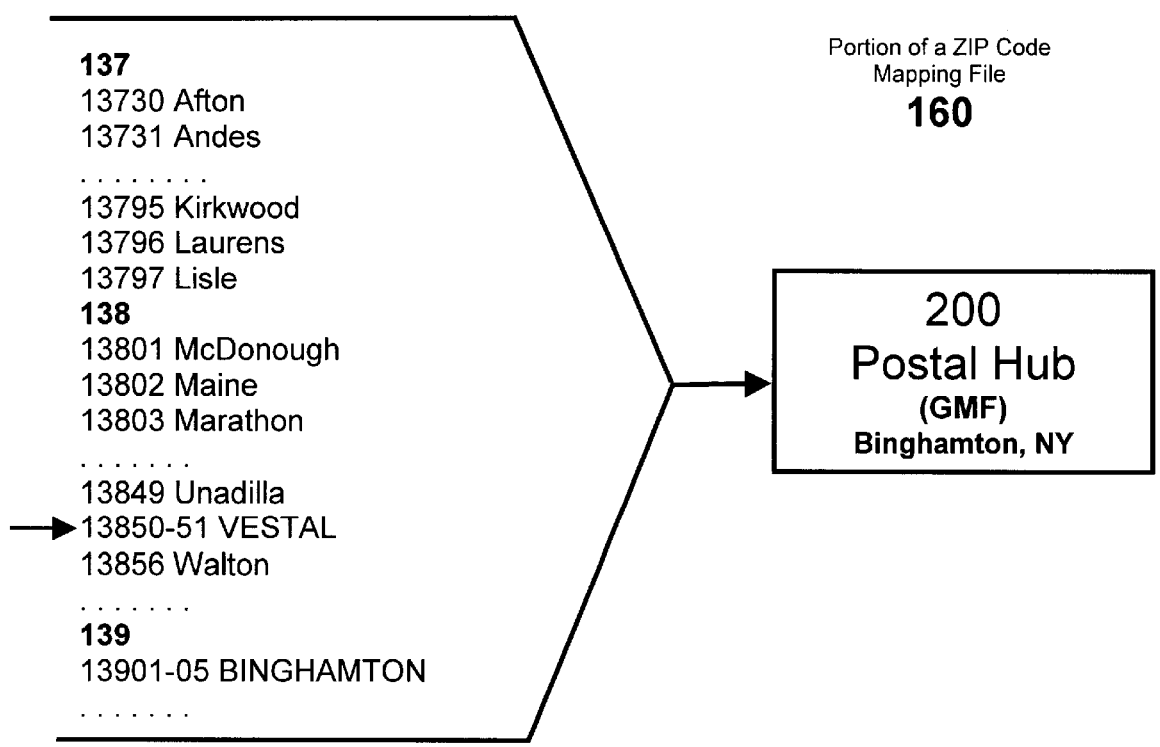
FIG. 4 is an illustrative portion of a ZIP Code mapping file.

In one implementation, a ZIP Code mapping file 160 is consulted in order to identify the incoming mail center 200 for which the mail piece 20 is destined. The ZIP Code mapping file 160 contains information relating to several incoming mail centers 200 such as the five-digit ZIP Code regions serviced by each of the several incoming mail centers 200. FIG. 4 shows a portion of the data that appears in an illustrative ZIP Code mapping file 160 relating five-digit ZIP Codes and city names to the postal hub at Binghamton, N.Y. For example, with respect to the mail piece 20 of FIG. 1, the outgoing mail center 100 at which the first address portion image 24' is resolved is the general mail facility (i.e., hub) at Worcester, Mass. The incoming mail center 200 is the hub at Binghamton, N.Y. which handles mail pieces 20 being delivered to all ZIP Codes beginning with "137," "138" and "139" as shown in the illustrative ZIP Code mapping file 160 of FIG. 4. In one version, the OCR 130 at Worcester begins delivery address resolution by attempting to resolve the five-digit ZIP Code as it appears in the first address portion image 24'. As the information in the first address portion image 24' is resolved, the resulting resolved primary address data 34 is compared to the ZIP Codes appearing in the ZIP Code mapping file 160 using comparitor algorithms. In this example, once the ZIP Code is resolved and "matched" to the third digit (i.e., out to "138"), sufficient resolution has taken place to positively identify a single incoming mail center 200 (i.e, the Binghamton hub). At this point, address resolution efforts may cease because the architecture at Worcester has all the information it requires to mechanically sort the mail piece 20 to an appropriate transport vehicle 158 bound for the incoming mail center 200 at Binghamton, N.Y. The resolution of the second portion image 26' is deferred and used for further processing as explained later in this description.

Once the incoming mail center 200 is positively identified, the resolved primary address data 34 is output to the sorting machine 140 and the mail piece 20 is sorted within the outgoing mail center 100 and placed onboard a transport vehicle 158 destined for the incoming mail center 200. The sorting within the outgoing mail center 100 is typically automated with the aid of at least one conveyor 155 and one or more sorting machines 140 that receive instructions from the CPU 112 based on the resolved primary address data 34. Typically, the sorting machine 140 includes a plurality of pockets (not shown), each of which pockets corresponds to a destination city and/or an incoming mail center 200. Furthermore, each physical slot or pocket in the sorting machine 140 typically corresponds to a particular mode of transportation such as aircraft, truck or train, for example.

If the resolution and comparitor algorithms detect ambiguity in the ZIP Code on the mail piece 20, or if there is no ZIP Code on the mail piece 20, for example, confirmatory and/or alternative processing of the city and state name information in the first address portion image 24' may begin. If a single incoming mail center 200 cannot be identified upon comparing any part of the first address portion image 24' to the information in the ZIP Code mapping file 160, the sorting machine 140 routes the mail to a "reject" receptacle 134. From the reject receptacle 134, physical mail pieces 20 are inspected by human personnel who interpret and enter correct address information into the resolved address data block 55 at computer work stations. The personnel at the work stations 135 interpret and enter at least enough information into the resolved address data block 55 to permit automated sortation to an appropriate transport vehicle 158, as if sufficient optical character recognition had taken place. For example, the workstation personnel may enter ZIP Code, city and/or state information (i.e., resolved primary address data 34) into the resolved address data block 55. When a mail piece 20 is sent to the reject receptacle 134 it already has a unique identification mark 30 on it so it can be matched with the computer memory data already in memory 120 and associated with the computer memory record 30' of the unique identification mark 30. In other words, there is already at least a "place holder" in memory 120 that can be associated with the unique identification mark 30 on the physical mail piece 20. In one version, this "place holder" is in the form of a mail piece computer memory folder 60. The mail piece computer memory folder 60 remains in memory 120, ready to receive address information, as it becomes available. Once personnel have entered correct data for rejected mail pieces 20, the unique identification marks 30 on the physical mail pieces 20 are read by an identification reader 136 that is associated with the sorting machine 140 from which they are entered back into the sortation system. Once the mail pieces 20 are scanned by the identification reader 136, the CPU 112 associates the unique identification mark 30 with the corresponding resolved address data entered manually at the workstations 135. This association permits access to the resolved secondary address data 36 so that sorting instructions (i.e., signals) can be sent to the sorting machine 140 in the ordinary course.

As previously stated, the interpretation of the second address portion image 26' into an alphanumeric string of resolved secondary address data 36 is deferred. Once resolved, this information is stored in the resolved address data block 55. Resolution of the second address portion image 26' is deferred in recognition of the fact that the incoming mail center 200 does not require the resolved secondary address data 36 prior to the arrival of the physical mail piece 20 at the incoming mail center 200. Therefore, resolution of secondary address information can be postponed until off-peak times, for example, thereby liberating computer and human resources to process tasks that require processing sooner rather than later. Deferred processing is particularly useful in alleviating process bottlenecks that might otherwise be experienced during peak operating times.

In one implementation, data is stored relating the outgoing mail center 100 to each incoming mail center 200 to which the outgoing mail center 100 transports mail pieces 20. More specifically, at least one predetermined transport time corresponding to each incoming mail center 200 is maintained. Based on this information, a scheduler 180 assigns a deferral time $T_D$ corresponding to a mail piece 20. In one implementation, the deferral time $T_D$ is stored in association with the computer memory record 30' of the unique identification mark 30 corresponding to the physical mail piece 20. For example, in one version, the deferral time $T_D$ is stored as a "tag" on the mail piece computer memory folder 60.

Among the factors that determine the deferral time $T_D$ associated with a particular mail piece 20 are distance to the incoming mail center 200, mode or modes of transportation between the outgoing and incoming mail centers 100 and 200, and class of mail (e.g., first, second, third, priority, express, etc.). Furthermore, the time and date of processing may also be considered. For example, it is not uncommon for an outgoing mail center 100 to have two or more departure times per day for the same incoming mail center 200. Depending on the time of day of each transport vehicle's departure, and the one or more modes of transportation associated with each departure time, the time required to transport a mail piece 20 to the incoming mail center 200 may be different. For instance, a first class mail piece 20 departing on a transport vehicle 158 from the Worcester hub at 10:00 am may require eight hours to arrive at the Binghamton hub. In contrast, a first-class mail piece 20 departing the Worcester hub at 7:00 pm may require only five hours to arrive at the Binghamton hub. The time differential is relatively small when considering transport between two mail centers as closely separated as Worcester and Binghamton. However, one can readily appreciate how this reality of transport can manifest itself over longer distances such as between Worcester and Los Angeles. Furthermore, even the time deferrals associated with shorter distances between mail centers 100 and 200 are significant.

In one version, in order to account for transport-time variability as a function of departure time, the "check-in time" $T_{CI}$ for a particular mail piece 20 is stored in association with the computer memory record 30' of the unique identification mark 30, for example. An example of such an association is shown in FIG. 3 is which the mail piece data folder 60 corresponding to a physical mail piece 20 is "tagged" with a check-in time $T_{CI}$ of 09:51:38. The check-in time could be, for instance, the time of day that the mail piece 20 is scanned by the OCR 130 at the outgoing mail center 100. In one version, an intra-facility processing time $T_{IFP}$ representing the required processing time at the outgoing mail center 100 is factored in. For instance, if a mail piece 20 normally requires at least 90 minutes to process from the check-in time $T_{CI}$ until loading on a transport vehicle 158, then a mail piece 20 checked in at 9:51:38 am will not be ready for departure at 10:00 am. Accordingly, in keeping with the example above, the next available transport to Binghamton is not until 7:00 pm. Therefore, the incoming mail center 200 at Binghamton does not need the resolved secondary address data 36 until at least 12:00 am the next morning and a deferral time $T_D$ reflecting the additional allowable time would be assigned accordingly. In one version, a comparitor compares the intra-facility processing time $I_{PT}$ to the time remaining until the next departure for the incoming mail center 200 for which the mail piece 20 is bound. If the intra-facility processing time $I_{PT}$ is greater than the time remaining until the very next departure, the mail piece will be assigned a deferral time $T_D$ corresponding to the departure time of the transport vehicle 158 following the very next departure. In addition to time of day, deferral times $T_D$ may also depend on day-of-week and day-of-year information, for example. An example of the day-of-year effect on transport time was provided in the summary section of this specification. In one version, the check-in time $T_{CI}$ is used later in the processing of the mail piece 20 to determine the transit time as explained further in this description.

In one implementation, the deferral time $T_D$, once determined for a mail piece 20, is associated in memory 120 with the computer memory record 30' of the unique identification mark 30 so that the stored data (e.g., secondary address portion images 26') for plural mail pieces 20 can be prioritized for resolution. For instance, consider a first mail piece 20 checked in at 10:14:23 am and assigned a deferral time $T_D$ of 14.00 hours maximum, and a second mail piece 20 checked in on the same day at 11:33:33 am and assigned a deferral time TD of 6.00 hours maximum. The resolution of the second address portion image 26' for the second mail piece 20 would be performed prior to the resolution of the second address portion image 26' for the first mail piece 20 because, at 11:33:33 am, the resolved secondary address data 36 for the second mail piece 20 is required before the expiration of 6.00 hours, whereas the resolved secondary address data 36 for the first mail piece 20 is not required for another 12 hours, 40 minutes and 50 seconds. In contrast, in a first-come-first-served system, the resolution of the second address portion image 26' for the first mail piece 20 would be performed prior to the resolution of the second address portion image 26' for the second mail piece 20 simply because the first mail piece 20 was checked in prior to the second mail piece 20.

Referring to FIG. 5, an illustrative scheduler 180 includes a look-up table relating an outgoing mail center 100 to various incoming mail centers 200. In the example of FIG. 5, the outgoing mail center 100 is the hub at Worcester. The outgoing mail center 100 at Worcester is related in the table to the incoming mail centers 200 at Binghamton, Buffalo and Rochester, N.Y. and Austin and Midland, Tex. Furthermore, in this particular example, each deferral time TD is expressed in terms of a window including a minimum time that must elapse and a maximum time that can elapse before resolved secondary address data 36 is accessible to the incoming mail center 200. For example, consider a mail piece 20 departing the outgoing mail center 100 at Worcester at 10:10 am and bound for the incoming mail center 200 at Buffalo, N.Y. Referring to the corresponding time window in FIG. 5, the incoming mail center 200 at Buffalo does not need the resolved secondary address data 36 any sooner than 18.25 hours after departure from the outgoing mail center 100 at Worcester (or whatever point in time is used to trigger the start of the deferral time clock). At the other end of the window, a maximum allowable time of 19.25 hours has been established by which the incoming mail center 200 at Buffalo must have available for its use the resolved secondary address data 36.

In one version, each outgoing mail center 100 is equipped with a scheduler 180 that relates only that outgoing mail center 100 to all of the incoming mail centers 200 to which that outgoing mail center 100 sends mail pieces 20. In another version, an off-site scheduler 180 is communicatively linked to at least two outgoing mail centers 100 for which it assigns deferral times $T_D$ to mail pieces 20.

Figure 6:
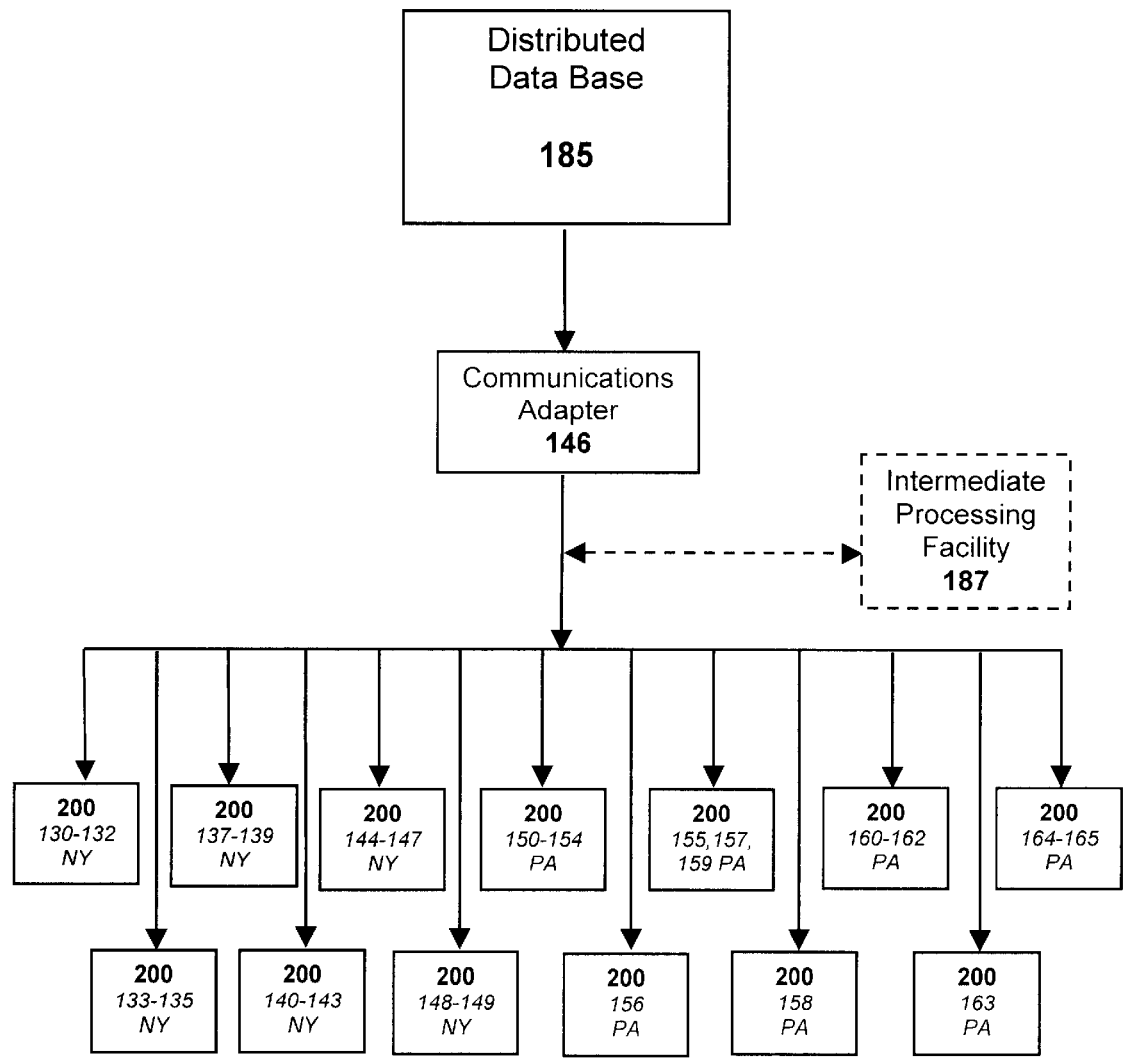
FIG. 6 is of a distributed data base that distributes address information to various incoming mail centers.

Referring to FIGS. 3 and 6, a distributed data base 185 containing stored address information corresponding to each physical mail piece 20 of a plurality of mail pieces 20 distributes the address information via the communications link 148 to various incoming mail centers 200. FIG. 6 represents only an illustrative portion of a distributed database 185 and the incoming mail centers 200 communicatively linked to the distributed database 185. The address information is distributed in accordance with the destination of the physical mail pieces 20 to which the stored address information corresponds and in accordance with the deferral times $T_D$ associated with the stored address data pertaining to the physical mail pieces 20. The address information that is communicated to an incoming mail center 200 for any single mail piece 20 can be in alternative forms. For example, the second address portion image 26' for a mail piece 20 may be resolved at the outgoing mail center 100 while the mail piece 20 to which it corresponds is in transit to the incoming mail center 200. In this case, the resolved secondary address data 36 is communicated in association with the computer memory record 30' of the unique identification mark 30 to the incoming mail center 200. In another version, the unresolved second address portion image 26' data is communicated from the outgoing mail center 100 to the incoming mail center 200, or to some third, intermediate processing facility 187, for resolution to resolved secondary address data 36. The principal concern is that, by the time the incoming mail center 200 requires it, the resolved secondary address data 36 is available for further sorting and routing of each mail piece 20, regardless of where the address data is resolved. Address information can be communicated between outgoing and incoming mail centers 100 and 200 by alternative media including, for example, hardwire electrical signal conduits, optical fiber cables and/or electromagnetic waves received and transmitted by satellites or other signal relaying apparatus.

In one version, a distributed database 185 is located at each outgoing mail center 100. In another version, each of at least two outgoing mail centers 100 transmits address information to an off-site distributed database 185 that serves two or more outgoing mail centers 100 where it is then processed and distributed to the various incoming mail centers 200.

In alternative implementations, the address information that is transmitted to an incoming mail center 200 includes, for example, the image data block 50 with the first and second address portion images 24' and 26'; the second address image portion 26' without the first address image portion 24'; the resolved primary address data 34; the resolved secondary address data 36; and the computer memory record 30' of unique identification mark 30. Transmission of the computer memory record 30' of the unique identification mark 30 with the associated address data facilitates the association of the address data with the corresponding physical mail piece 20 at the incoming mail center 200. Regardless of the type of information that is transmitted, in one version, the information corresponding to a single physical mail piece 20 is assembled in a mail piece computer memory folder 60 and the entire computer memory folder 60 is transmitted to the incoming mail center 200.

Figure 7:
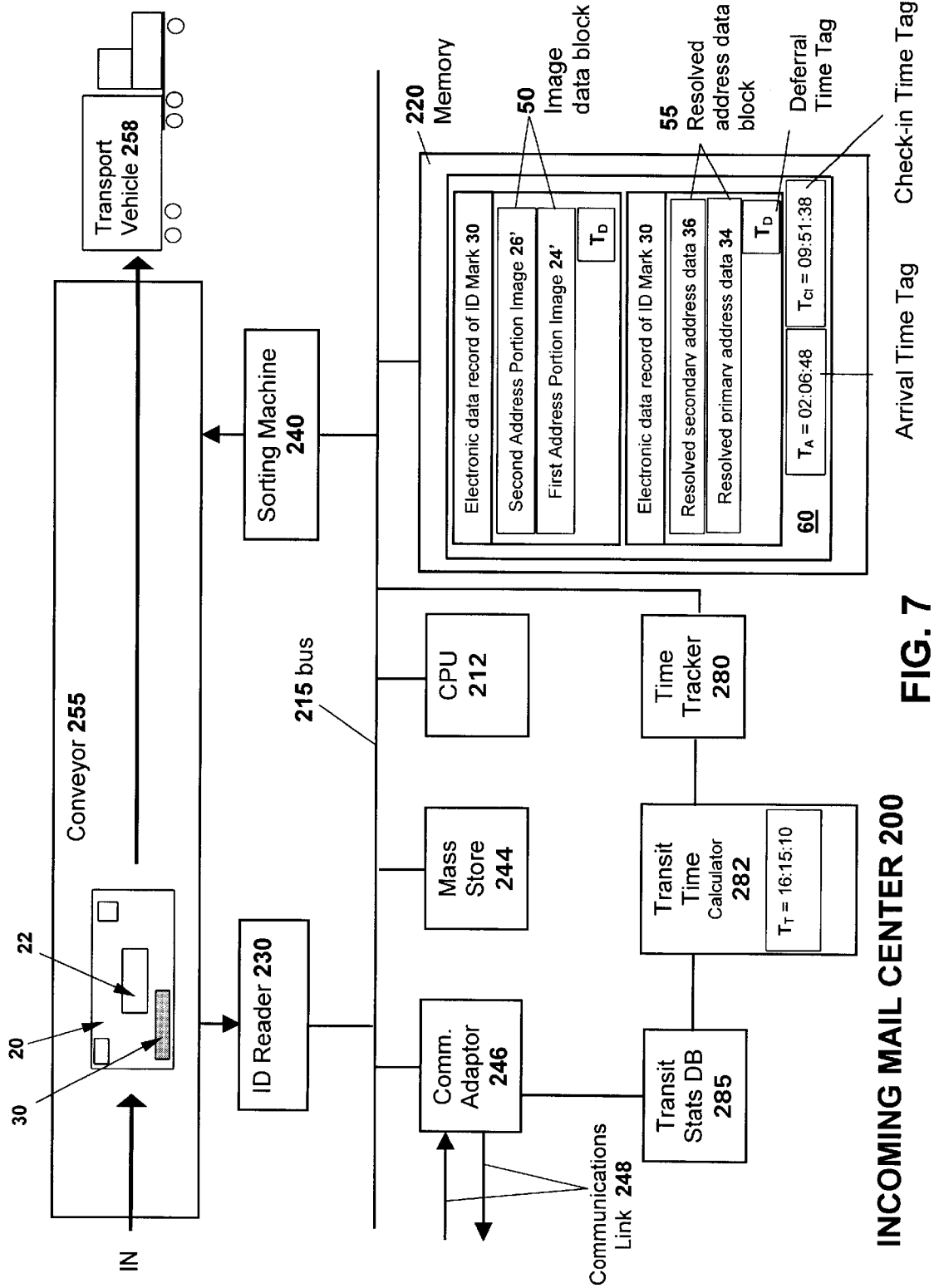
FIG. 7 is an architectural block diagram of an incoming mail center.

Referring to FIG. 7, a physical mail piece 20 arrives at an incoming mail center 200 and an identification reader 230 scans the unique identification mark 30 appearing on the mail piece 20. By this time, the resolved secondary address data 36 for the mail piece 20 is accessible to the incoming mail center 200. The CPU 212 at the incoming mail center 200 associates the identification mark 30 as read from the physical mail piece 20 with the corresponding resolved secondary address data 36 that is stored in memory 220 and applies this information to send instructions to the sorting machine 240. The sorting machine 240 further sorts the mail piece 20 to an appropriate transport vehicle 258 for further delivery. When, for example, the incoming mail center 200 is a hub that services several local branch offices 300, mail pieces 20 are sorted at least finely enough to route them to their respective local branch offices 300 and the mail pieces 20 are transported accordingly. However, in at least one version, the mail pieces 20 are sorted down to delivery sequence at the incoming mail center 200 hub such that, when they arrive at their respective local branch offices 300, they need not be sorted again for delivery to individual addresses.

In one version, a time tracker 280 logs the arrival time $T_A$ of a mail piece 20 at the incoming mail center 200. The arrival time $T_A$ can correspond, for example, to a second predetermined point in the handling process at the incoming mail center 200. For instance, the assigned arrival time $T_A$ may be the time at which the identification reader 230 reads the unique identification mark 30. The arrival time $T_A$ for each mail piece 20 is associated with the computer memory record 30' of the unique identification mark 30 corresponding to each mail piece 20 for which transit time $T_T$ is to be tracked. A transit time calculator 282, once provided with the departure time or check-in time $T_{CI}$, for example, and the arrival time $T_A$ of a particular mail piece 20, calculates the transit time $T_T$ for the mail piece 20. The transit time data is stored in a transit-statistics data base 285. In the example of FIG. 7, the mail piece 20 checked in at $T_{ci}$=09:51:38 the previous day at the outgoing mail center 100 in FIG. 3 arrives at the incoming mail center 200 at 02:06:48 as shown in association with the mail piece computer memory folder 60 corresponding to the mail piece 20 in FIG. 7. In the example of FIG. 7, the transit time calculator 282 calculates the transit time as $T_T$=16 hours 15 min. and 10 sec. (i.e., 16:15:10). This information is then communicated to the transit-statistics data base 285 from which it can be retrieved and compiled with data relative to other mail pieces 20 for the purposes of calculating average transit times $T_T$, for example.

In alternative versions, any or all of the time tracker 280, transit time calculator 282 and the transit-statistics data base 285 may be located at the incoming mail center 200 or at an off-site facility. When any or all of the time tracker 280, transit time calculator 282 and the transit-statistics data base 285 are located off-site, the relevant data is communicated through the communications adaptor 246 to the proper location for processing and/or storage, for example.

A transit-statistics database 285 is part of the architecture of the incoming mail center 200 shown in FIG. 7. In another version, an off-site transit-statistics database 285 is communicatively linked to, and receives transit data from, several incoming mail centers 200. In another version, a time calculator 282 and transit i5 statistics database 285 are maintained at each outgoing mail center 100. In this version, arrival time $T_A$ information is distributed back to the various outgoing mail centers 100 from which respective mail pieces 20 originated so that the transit time calculators 282 at the outgoing mail centers 100 of origin can compute the elapsed transit times $T_T$ for mail pieces 20 handled by them.

Regardless of where transit time data is computed and stored, the transit time data is useful in computing appropriate deferral times $T_D$ for use in a scheduler 180. In one version, deferral times $T_D$ used in schedulers 180 are updated periodically based on transit-time data maintained over a predetermined period of time. In another version, deferral times $T_D$ are constantly updated on the basis of real-time statistical data. For instance, a deferral time $T_D$ associated with a particular departure time from a particular outgoing mail center 100 and incoming mail center 200 may be constantly updated on the basis of a moving average transit time over a fixed duration. By way of illustration, a deferral time $T_D$ may be calculated on the basis of the average transit time $T_T$ between a particular outgoing mail center 100 and a particular incoming mail center 200, for a particular scheduled departure time, over the immediately previous 120 hours (i.e., 5 days).

Figure 8:
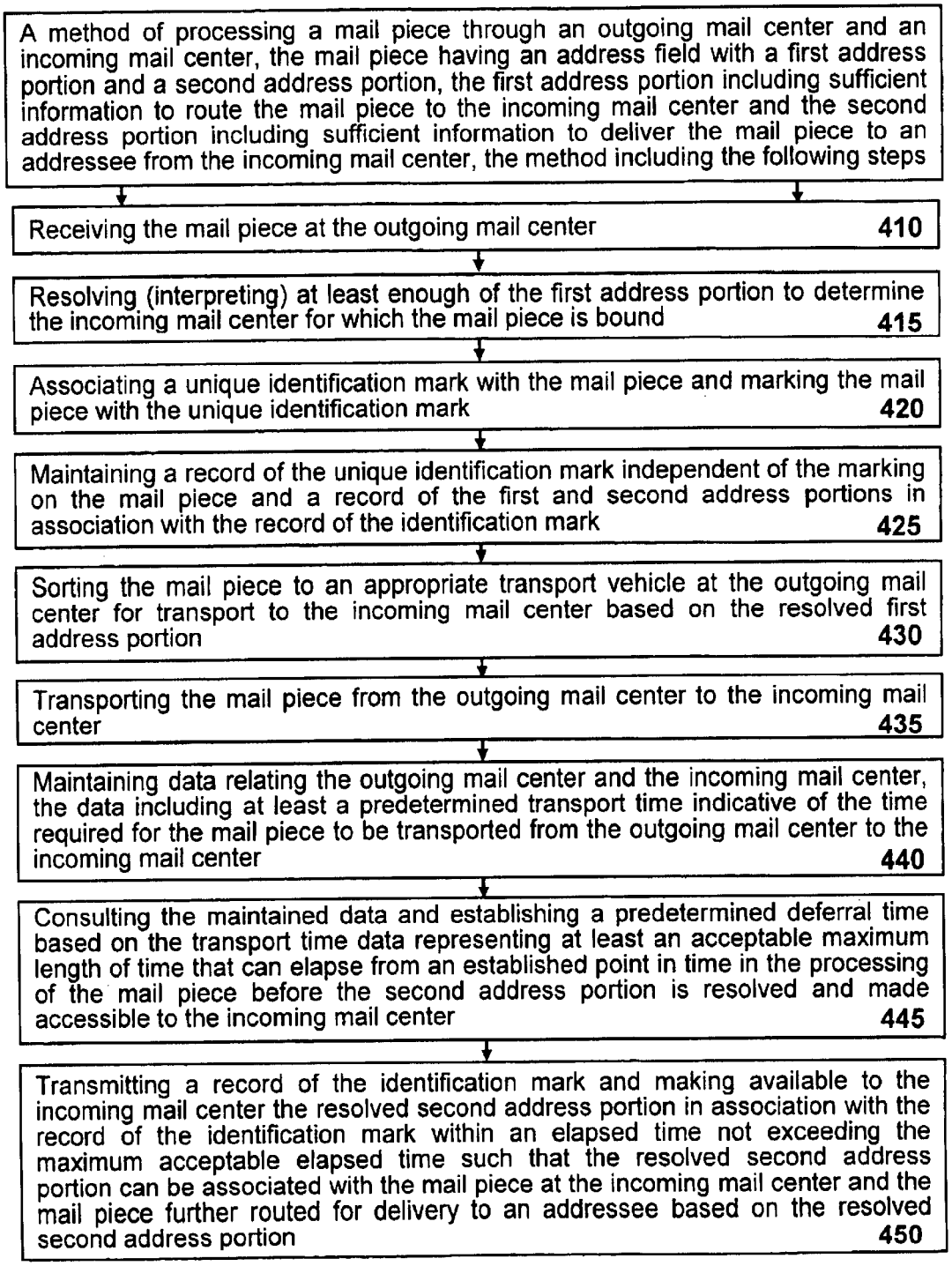
FIG. 8 illustrates the steps of a method for deferred processing of a mail piece.

Referring to FIGS. 8 and 9, a sequence of method steps illustrates a method of deferred postal address processing. It should be noted that the sequence of steps presented in the drawings is illustrative only and not necessarily indicative of the order in which the steps must be performed. Accordingly, nothing in the drawings, this description or the corresponding claims should be construed so as to limit the scope of the invention to a particular sequence of steps in the absence of explicit statements to the contrary or unless a particular order is inextricably dictated by context. For example, analysis of a captured image cannot take place before that image is captured. Reference is made to FIGS. 1 through 7 for illustrations of apparatus, architecture and mail pieces discussed in connection with mail processing methods.

Referring to FIG. 8, a method of processing a mail piece 20 including a destination address field 22 with a first address portion 24 and a second address portion 26 through an outgoing mail center 100 and an incoming mail center 200 is illustrated. The first address portion 24 includes sufficient information to identify a single incoming mail center 200 and to route the mail piece 20 to that incoming mail center 200. The second address portion 26 includes sufficient information to route and deliver the mail piece to an addressee from the incoming mail center 200, either directly or through another mail handling facility or post office subsequent to the incoming mail center 200.

At step 410, a mail piece 20 is received at the outgoing mail center 100. The first address portion 24 is analyzed at step 415 until at least enough of the first address portion has been resolved to identify the incoming mail center 200 for which the mail piece 20 is bound. In step 420, a unique identification mark 30 is associated with the mail piece 20 and the mail piece 20 is marked with the identification mark 30. At step 425, a record independent of the marking on the physical mail piece 20 is made and maintained of the unique identification mark 30 and a record of the first and second address portions 24 and 26 is made and maintained in association with the record of the identification mark 30. In step 430, the mail piece 20 is sorted at the outgoing mail center 100 to a transport vehicle 158 for transport to the incoming mail center 200 based on the resolved first address portion. The physical mail piece 20 is transported to the incoming mail center 200 in accordance with step 435. In accordance with step 440, data is maintained that relates the outgoing mail center 100 to the incoming mail center 200. The data includes at least a predetermined transport time indicative of the time required for a mail piece 20 to be transported from the outgoing mail center 100 to the incoming mail center 200. At step 445, the maintained transport time data is consulted and a deferral time is established. The deferral time represents at least an acceptable maximum length of time that can elapse from an established point in time in the processing of the mail piece 20 before the second address portion is resolved and made accessible to the incoming mail center 200. In step 450, a record of the identification mark 30 is transmitted and made available to the incoming mail center 100 in association with the resolved second address portion within an elapsed time not exceeding the maximum acceptable elapsed time such that the resolved second address portion can be associated with the physical mail piece 20 at the incoming mail center 200. At the incoming mail center 200, the mail piece 20 is further routed for delivery to an addressee based on the resolved second address portion.

Referring to FIG. 9, the steps included in another version of a mail handling process are illustrated. In step 460, the outgoing mail center 100 receives the mail piece 20. At the outgoing mail center 100, an image 22' is captured of the destination address field 22 appearing on the physical mail piece 20 in step 465. The captured image 22' includes a first address portion image 24' corresponding to the first address portion 24 of the destination address field 22 on the mail piece 20 and a second address portion image 26' corresponding to the second address portion 26 of the destination address field 22 on the mail piece 20. The image is stored in computer memory 120 and/or the mass store 144 of a data processing system 110, for example. The computer memory 120 includes, for example, digital, electronic, laser-readable and/or magnetic media. Step 470 facilitates subsequent association between the physical mail piece 20 and the image and other data to be stored in memory 120 by assigning a unique identification mark 30, such as a bar code representing a serial number, to the mail piece 20. The identification mark 30 is physically applied to the mail piece 20 and an computer memory record 30' of the identification mark 30 is stored in association with the image 22' of the destination address field 22. According to step 475, the first address portion image 24' is analyzed and resolved to generate a first signal representing the incoming mail center 200. This signal is sent to a sorting machine, for example, and at step 480, the mail piece 20 is sorted for transport to the incoming mail center 200 in response to the first signal. According to step 485, data is maintained that relates the outgoing mail center 100 to the incoming mail center 200. The maintained data includes a transit time indicative of the time required for a mail piece 20 to be physically transported from the outgoing mail center 100 to the incoming mail center 200. In step 490, the data maintained in step 485 is consulted. Based on this data, a deferral time $D_T$ is assigned that represents at least an acceptable maximum length of time that can elapse from a first established point in time in the processing of the mail piece 20 before the second address portion image 26' is resolved and the results of resolution are rendered accessible to the incoming mail center 200. During step 495, the physical mail piece 20 is transported between the outgoing mail center 100 and the incoming mail center 200 by one or more transport vehicles 158, for example. In step 500, the second address portion image 26' is resolved to generate a signal representing the information necessary to further sort and route the mail piece 20 at the incoming mail center 200 for delivery to the addressee. At step 505, the second signal is rendered accessible to the incoming mail center 200 before the expiration of the maximum acceptable elapsed time as represented in the deferral time $D_T$. The mail piece 20 is received by the incoming mail center 200 at step 510 and identified and associated with second signal at step 515. In accordance with step 520, the mail piece is sorted by an automated sorting machine 240, for example, in response to the second signal for delivery to the addressee.

The foregoing is considered to be illustrative of the principles of the invention. Furthermore, since modifications and changes will occur to those skilled in the art without departing from the scope and spirit of the invention, it is to be understood that the foregoing does not limit the invention as expressed in the appended claims to the exact construction, implementations and versions shown and described.

What is claimed is:

1. A method for deferred processing of a mail piece through an outgoing mail center and an incoming mail center for ultimate delivery to an addressee, the mail piece having an destination address field with a first address portion including sufficient information to route the mail piece to the incoming mail center and a second address portion including sufficient information to deliver the mail piece to an addressee from the incoming mail center, comprising the steps of:

receiving the mail piece at the outgoing mail center;

resolving the first address portion to determine the incoming mail center;

associating a unique identification mark with the mail piece and marking the mail piece with the unique identification mark;

maintaining a record of the unique identification mark independent of the marking on the mail piece and a record of the first and second address portions in association with the record of the identification mark;

sorting the mail piece to an appropriate transport vehicle at the outgoing mail center for transport to the incoming mail center based on the resolved first address portion;

transporting the mail piece from the outgoing mail center to the incoming mail center;

maintaining data relating the outgoing mail center and the incoming mail center, the data including at least a predetermined transit time indicative of the time required for the mail piece to be transported from the outgoing mail center to the incoming mail center;

consulting the maintained data and establishing a predetermined deferral time based on the transport time data, the deferral representing at least an acceptable maximum length of time that can elapse from an established point in time in the processing of the mail piece before the second address portion is resolved and made accessible to the incoming mail center; and transmitting a record of the identification mark and rendering accessible to the incoming mail center the resolved second address portion in association with the record of the identification mark within an elapsed time not exceeding the maximum acceptable time of the predetermined deferral time such that the resolved second address portion can be associated with the mail piece at the incoming mail center and the mail piece routed for delivery to an addressee.

2. A method for deferred processing of a mail piece through an outgoing mail center and an incoming mail center for ultimate delivery to an addressee, the mail piece having a destination address field with a first address portion including sufficient information to route the mail piece to the incoming mail center and a second address portion including sufficient information to deliver the mail piece to an addressee from the incoming mail center, comprising the steps of:

receiving the mail piece at the outgoing mail center;

capturing an image of the destination address field at the outgoing mail center and storing the image in computer memory, the captured image including a first address portion image corresponding to the first address portion of the destination address field on the mail piece and a second address portion image corresponding to the second address portion of the destination address field on the mail piece;

marking the mail piece with a unique identification mark representing its identity and storing a computer memory record of the identification mark in association with the stored image of the destination address field;

resolving the first address portion image to generate a first signal representing the incoming mail center;

sorting the mail piece at the outgoing mail center in response to the first signal for transport to the incoming mail center;

maintaining data relating the outgoing mail center and the incoming mail center, the data including at least a predetermined transit time indicative of the time required for the mail piece to be transported from the outgoing mail center to the incoming mail center;

consulting the maintained data and assigning a deferral time based on the transport time data, the deferral time representing at least an acceptable maximum length of time that can elapse from a first established point in time in the processing of the mail piece before the second address portion image is resolved and the results of resolution rendered accessible to the incoming mail center;

transporting the mail piece from the outgoing mail center to the incoming mail center;

resolving the second address portion image to generate a second signal representing the information necessary to further route the mail piece for delivery to an addressee from the incoming mail center;

rendering the second signal accessible to the incoming mail center before the expiration of the maximum acceptable elapsed time;

receiving the mail piece at the incoming mail center;

identifying the mail piece at the incoming mail center by reading the unique identification mark thereon and associating the mail piece with the second signal; and sorting the mail piece in response to the second signal for delivery to the addressee.

3. The method according to claim 2 wherein the deferral time comprises a time window including, in addition to a maximum length of time that can elapse from a first established point in the processing of the mail piece before the second address portion is resolved and made accessible to the incoming mail center, a minimum length of time that must elapse from the first established point in the processing of the mail piece before resolution of the second address portion image commences and wherein the step of resolving the second address portion does not commence prior to the expiration of the minimum length of time.

4. The method according to claim 2 wherein the second signal is received by the incoming mail center via a communications link from a distributed data base that stores and distributes second signals corresponding to plural mail pieces to diverse incoming mail centers.

5. The method according to claim 2 wherein the incoming mail center receives the unresolved second address portion image associated with the computer memory record of the unique identification mark corresponding to the physical mail piece and wherein resolution of the second address portion image to generate the second signal occurs at the incoming mail center.

6. The method according to claim 2 wherein the deferral time is assigned by a scheduler that consults a look-up table including at least one deferral time relative to the outgoing mail center and the incoming mail center.

7. The method according to claim 6 wherein the look-up table includes a deferral time corresponding to each scheduled time of departure of a transport vehicle from the outgoing mail center and carrying mail pieces bound for the incoming mail center.

8. The method of claim 7 wherein each deferral time associated with a particular outgoing mail center and incoming mail center is updated to fix intervals on the basis of accumulated transit-time statistics relative to the transport of mail pieces between the outgoing and incoming mail centers.

9. The method according to claim 2 wherein the step of maintaining data relating the outgoing mail center to the incoming mail center includes the step of tracking an elapsed time between a first point in time in the processing of each mail piece of a selected plurality of mail pieces and a second time in the processing of each mail piece of the selected plurality of mail pieces.

10. The method according to claim 9 further comprising the steps of:

(i) assigning a check-in time to a mail piece at the outgoing mail center and storing the check-in time in computer memory in association with the computer memory record of the unique identification mark corresponding to the mail piece;

(ii) assigning an arrival time to the mail piece at the incoming mail center and storing the arrival time in computer memory in association with the computer memory record of the unique identification mark corresponding to the mail piece; and (iii) computing and storing a computer memory record of the elapsed time between the check-in time and the arrival time.

11. A method for deferred processing of a mail piece through an outgoing mail center and an incoming mail center for delivery to an addressee, the mail piece having a destination address field with a first address portion including sufficient information to route the mail piece to the incoming mail center and a second address portion including sufficient information to deliver the mail piece to an addressee from the incoming mail center, comprising the steps of:

receiving the mail piece at the outgoing mail center;

capturing an image of the destination address field at an outgoing mail center and storing the image in computer memory, the captured image including a first address portion image corresponding to the first address portion of the destination address field on the mail piece and a second address portion image corresponding to the second address portion of the destination address field on the mail piece;

marking the mail piece with a unique identification mark representing its identity and storing a computer memory record of the identification mark in association with the stored image of the destination address field;

resolving the first address portion image to generate a first signal representing the incoming mail center;

sorting the mail piece at the outgoing mail center in response to the first signal for transport to the incoming mail center;

maintaining data relating the outgoing mail center and the incoming mail center, the data including at least a predetermined transit time indicative of the time required for the mail piece to be transported from the outgoing mail center to the incoming mail center;

consulting the maintained data and assigning a deferral time based on the transport time data, the deferral time representing at least one of (i) a minimum length of time that must elapse from a first established point in time in the processing of the mail piece before resolution of the second address image portion commences and (ii) a maximum length of time that can elapse from the first established point in time in the processing of the mail piece before the second address portion image is resolved and the results of resolution rendered accessible to the incoming mail center and;

transporting the mail piece from the outgoing mail center to the incoming mail center;

resolving the second address portion image after the expiration of any minimum length of time represented by the deferral time to generate a second signal representing the information necessary to further route the mail piece for delivery to an addressee from the incoming mail center;

rendering the second signal accessible to the incoming mail center before the expiration of any maximum length of time represented by the deferral time;

receiving the mail piece at the incoming mail center;

identifying the mail piece at the incoming mail center by reading the unique identification mark thereon and associating the mail piece with the second signal; and sorting the mail piece in response to the second signal for delivery to the addressee.

* * * * *